United States Patent
Hickl et al.

(10) Patent No.: US 7,383,498 B1
(45) Date of Patent: Jun. 3, 2008

(54) EDITING STYLES FOR MARKUP DOCUMENTS USING PARAMETRIZED STYLES SHEETS

(75) Inventors: Timo Hickl, Eschelbach (DE); Marcus Holl, Heidelberg (DE)

(73) Assignee: SAP AG, Walldorf (DE)

( * ) Notice: Subject to any disclaimer, the term of this patent is extended or adjusted under 35 U.S.C. 154(b) by 424 days.

(21) Appl. No.: 10/330,493

(22) Filed: Dec. 27, 2002

(51) Int. Cl.
*G06N 3/00* (2006.01)

(52) U.S. Cl. ...................... 715/235; 715/513

(58) Field of Classification Search .............. 707/513, 707/1, 517, 203; 715/522, 513, 235
See application file for complete search history.

(56) References Cited

U.S. PATENT DOCUMENTS

| | | | |
|---|---|---|---|
| 6,023,714 A * | 2/2000 | Hill et al. ................ | 715/513 |
| 2001/0044809 A1* | 11/2001 | Parasnis et al. .......... | 707/513 |
| 2003/0037076 A1* | 2/2003 | Bravery et al. ........... | 707/517 |
| 2003/0233620 A1* | 12/2003 | Vedullapalli et al. ..... | 715/522 |
| 2004/0205551 A1* | 10/2004 | Santos ..................... | 715/513 |

OTHER PUBLICATIONS

NPL (WEB-Google.com), Don, Dynamic Style Sheets in ASP, (Jul. 8, 2001), pp. 1-2.*
Wilson, Document Object Model CSS, Nov. 2000, W3C, pp. 1-57.*
Lie, Cascading Style SHeets, Level 1, Jan. 1999, W3C, pp. 1-70.*
Towers, Visual Quickstart Guide Dreamweaver 4 for Windows and Macintosh, Apr. 5, 2001, Peachpit Press, pp. 1-54.*

* cited by examiner

*Primary Examiner*—Stephen Hong
*Assistant Examiner*—Manglesh Patel
(74) *Attorney, Agent, or Firm*—Mintz, Levin, Cohn, Ferris, Glovsky & Popeo, P.C.

(57) ABSTRACT

Systems, methods, and apparatus, including computer program products, for applying style changes to markup language documents. A replacement style sheet parameter value, which is to replace an existing style sheet parameter value that is associated with a previously rendered markup language document, is received and applied to the rendered markup language document. The replacement style sheet parameter value may be included in a style block and inserted into a Document Object Model data structure that represents the rendered markup language document. Some implementations allow the effect of a design parameter change to be previewed immediately, without re-rendering an entire markup language document, regenerating one or more style sheets, or communicating with a server. Parametrized representations of style sheets may include bindings between parameters, which may result in more compact and efficient style sheet parametrizations in some implementations.

50 Claims, 4 Drawing Sheets

EDITING STYLES FOR MARKUP DOCUMENTS USING PARAMETRIZED STYLES SHEETS

BACKGROUND

The present application relates to markup language documents, and more particularly to the formatting of markup language documents.

Markup language documents contain content interspersed with markup language or tags. The markup language may be used to structure and define the content, as well as to format the content for display. For example, a Hypertext Markup Language (HTML) document may contain tags like <head> and <body> that organize the document's content into sections (in this case, a header section and a body section), as well as tags like <b> that cause content to be rendered or displayed in a certain manner (in this case, using boldface font).

Style sheets may be used in conjunction with markup language documents in order to help separate the functions of structuring and formatting the documents. Style sheets contain formatting descriptions that may be used to determine how certain elements or sections of a markup language document are to be displayed. For example, style sheets may be used to specify the font, color, and positioning of content in a markup language document. Thus, some of the formatting tags and functionality in a markup language document may be replaced by formatting instructions included in one or more style sheets. In the case of HTML documents, style sheets may work in conjunction with HTML tags to describe in more detail how the content in the documents is to be displayed.

By helping to collect formatting descriptions in a central location (e.g., in one or more files), style sheets may make it easier to modify and revise the formatting of markup language documents. However, markup language documents may require numerous formatting instructions, which may be stored in numerous style sheets, and it may be difficult and burdensome to edit extensive or multiple style sheets in a consistent manner. For example, if an organization wishes to change the text color on all pages on a certain portion of its web site, the style sheets that apply to those pages may have to be identified, and the appropriate color settings may have to be adjusted in all of those style sheets.

One approach that may make it easier to modify style sheets in a consistent manner is to parametrize the style sheets. A parametrized representation of a style sheet may contain one or more design parameters or variables, each of which may be set to or associated with a specific value or set of values. The parametrized representation of a style sheet may be used to generate the actual style sheet that is applied to a markup language document. The generated style sheet may contain multiple formatting instructions that either make use of, or that are based on, the values of the parameters. A formatting change may be effected by revising the value of a parameter in the parametrized representation of a style sheet, and regenerating the style sheet from the parametrized representation. The revised value of the parameter may be reflected in all of the formatting instructions in the style sheet that are based on the parameter.

SUMMARY

The present application teaches systems and techniques that may be used to apply style or formatting changes to rendered markup language documents. The formatting of a rendered markup language document may be revised to reflect a modified design parameter without necessarily regenerating one or more style sheets or re-rendering the entire markup language document. Instead, the modified design parameter may be used to generate a style block that may be applied directly to the rendered markup language document.

In one aspect, the invention features a method that includes receiving a replacement style sheet parameter value. The replacement style sheet parameter value is to be used to replace an existing style sheet parameter value that is associated with a previously rendered markup language document. The replacement style sheet parameter value is inserted into a data structure that is associated with the previously rendered markup language document.

Advantageous implementations may include one or more of the following features. The data structure may be a Document Object Model data structure. The inserted replacement style sheet parameter value may override the existing style sheet parameter value. Inserting the replacement style sheet parameter value may change the appearance of the previously rendered markup language document without re-rendering the entire markup language document.

Inserting the replacement style sheet parameter value may include generating a style block containing the replacement style sheet parameter value. The replacement style sheet parameter value may be stored in a parametrized representation of a style sheet. A style sheet that includes the replacement style sheet parameter value may be generated.

In another aspect, the invention features a machine-readable medium and method for applying style changes to a markup language document. A parametrized representation of a style sheet is generated. The parametrized representation includes a first parameter and a first value associated with the first parameter. A style sheet is generated from the parametrized representation. The generated style sheet is used to render a markup language document. A second value to be associated with the first parameter is received, and a style block based on the second value is generated. The style block is applied to the rendered markup language document.

Advantageous implementations may include one or more of the following features. The parametrized representation may include a table. The parametrized representation may contain a second parameter, and the table may have a first row corresponding to the first parameter and a second row corresponding to the second parameter. The second value may be received through a graphical user interface.

The markup language document may be rendered at a client computer, and the operations of generating and applying the style block may occur at the client computer. The operations of generating and applying the style block may occur substantially immediately after the operation of receiving the second value.

Applying the style block may include inserting the style block into a Document Object Model data structure that represents the markup language document. The second value may be stored in the parametrized representation. A new style sheet may be generated based on the parametrized representation with the second value.

In another aspect, the invention features a system including a parametrized representation of a style sheet. The parametrized representation contains a parameter and a first value associated with the parameter. The system includes a style sheet generated from the parametrized representation, and a machine-readable medium with instructions that, when executed, cause a machine to perform operations. The operations include receiving user input containing a second value to be associated with the parameter, generating a style block based on the second value, and applying the style block to a markup language document that is rendered using the style sheet.

Advantageous implementations may include one or more of the following features. The instructions may include JavaScript instructions. The user input may include a selection from a graphical user interface. The graphical user interface may have graphical abstractions, including text entry fields, buttons, menus, icons, and links. The machine may be a client computer.

The operation to generate the style block may be triggered automatically by reception of the user input, or manually by a user. The operation to apply the style block may include inserting the style block into a Document Object Model data structure that represents the rendered markup language document. The second value may be stored in the parametrized representation.

In another aspect, the invention features a system that includes a style sheet and a parametrized representation of the style sheet. The parametrized representation includes a first parameter corresponding to a first formatting property, a second parameter corresponding to a second formatting property, and a third parameter. The parametrized representation further includes a binding between the first parameter and the third parameter, a binding between the second parameter and the third parameter, and a formatting property value associated with the third parameter. The style sheet, which is generated from the parametrized representation, includes an association between the first formatting property and the formatting property value, and an association between the second formatting property and the formatting property value.

Advantageous implementations may include one or more of the following features. The third parameter may correspond to a formatting property type. The parametrized representation may include a table with a first row corresponding to the first parameter, a second row corresponding to the second parameter, and a third row corresponding to the third parameter.

In another aspect, the invention features a method that includes specifying a plurality of parameters, including at least a first parameter corresponding to a first formatting property, a second parameter corresponding to a second formatting property, and a third parameter. A binding is specified between the first parameter and the third parameter. A binding is also specified between the second parameter and the third parameter. A formatting property value is associated with the third parameter. A style sheet is generated. The style sheet includes an association between the first formatting property and the formatting property value, and an association between the second formatting property and the formatting property value.

Advantageous implementations may include one or more of the following features. The third parameter may correspond to a formatting property type. The first, second, and third parameters may be included in a parametrized representation of a style sheet. The parametrized representation may be stored. The generated style sheet may be used to render a markup language document.

A replacement formatting property value may be associated with the third parameter. A style block may be generated and inserted into a data structure associated with the rendered markup language document. The style block may include an association between the first formatting property and the replacement formatting property value, and an association between the second formatting property and the replacement formatting property value.

These general and specific aspects may be implemented using a system, a method, a computer program, or any combination of systems, methods, and computer programs.

The systems and techniques described herein may be implemented to realize one or more of the following advantages. The systems and techniques may be used to preview the effect of a design parameter change. A design parameter may be changed locally (i.e., at the same computer that is being used to display a markup language document using a style sheet based on the design parameter), and the change may be applied directly to the displayed markup language document. The effect of a design parameter change may be observed immediately, without regenerating one or more style sheets, re-rendering the entire markup language document, applying the change to additional markup language documents, or communicating with a server or another computer. The effect of a design parameter change may be observed in a flicker-free fashion. The systems and techniques described herein may also be used to create more compact and efficient parametrizations of style sheets. One implementation may achieve all of the above advantages.

Details of one or more implementations are set forth in the accompanying drawings and in the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and techniques described herein relate to the rendering and display of markup language documents. As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Markup language documents contain content interspersed with markup language or tags. For example, a markup language document may contain some numbers, as well as tags that organize the numbers into a table, as shown below:

```
<table>
 <tr> <td>11</td> <td>12</td> <td>13</td> </tr>
 <tr> <td>21</td> <td>22</td> <td>23</td> </tr>
</table>
```

The HTML example above specifies a table with six integers. The integers are arranged into two rows (identified by the <tr>, or "table row" tags), and two columns (identified by the <td>, or "table data" tags).

Figure 1:
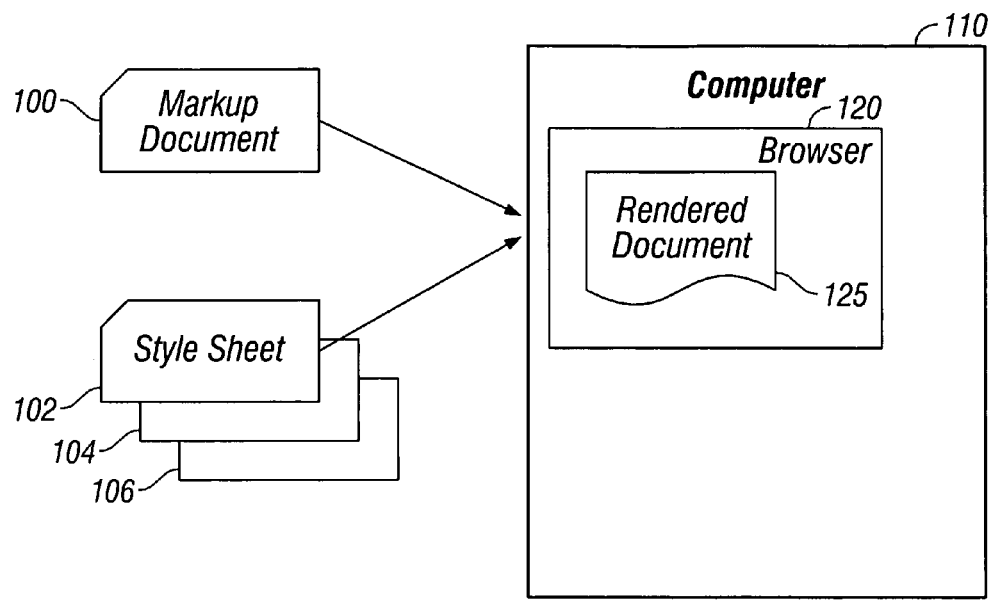
FIG. 1 is a block diagram of a system that uses style sheets to render a markup language document.

The HTML code in the example above may be specified in a markup language document 100 that may be displayed on a computer 110, as shown in FIG. 1. The computer 110 may execute a program, e.g., a browser 120, that may render the markup language document 100 and display it as a rendered document 125. If the markup language document 100 includes the HTML code specified in the example above, the rendered document 125 may include a table with two rows and three columns that displays the integers listed above.

The browser 120 may apply formatting specifications in a style sheet 102 to render the markup language document 100. The formatting specifications in the style sheet 102 may work in conjunction with the markup language document 100 to describe in more detail how the elements and content in the markup language document 100 are to be displayed by the browser 120. The formatting specifications may be used to determine the layout and positioning of the elements and content, as well as the appearance of the elements and content. For example, the style sheet 102 may include specifications as to the fonts, colors, and associated graphics that are to be used in rendering the elements and content.

Style sheets may have various formats. One standard type of style sheet is known as a Cascading Style Sheet (CSS). The specifications for Cascading Style Sheets, which are set forth by the World Wide Web Consortium (W3C), currently include two levels of functionality—CSS1 and CSS2.

The formatting descriptions in a Cascading Style Sheet may be specified as shown below:

```
selector {
    property1: value1;
    property2: value2;
    ...
}
```

The above specification may be interpreted as follows. The "selector" identifies the tags to which the bracketed formatting descriptions apply. The properties in the formatting descriptions may be any valid CSS properties. Examples of valid formatting properties include the properties shown in Table 1 below.

TABLE 1

| CSS Property | Style Affected by Property |
| --- | --- |
| color | text color |
| background-color | color of background behind text |
| font-family | font family in which to display text (e.g., Courier, Times New Roman, or Arial) |
| font-size | font size in which to display text (e.g., 8, 10, or 12 points) |
| border | border properties, including width, color, and style |
| width | width of rectangle in which to display an element |
| height | height of rectangle in which to display an element |
| text-align | horizontal alignment of text |

The properties in Table 1 above are only a few examples of formatting properties; the W3C CSS specifications include numerous additional properties that may be set or adjusted in a Cascading Style Sheet.

As indicated above, the formatting descriptions in a Cascading Style Sheet may associate values with properties. For example, the "color" property may be set to the value "green" to indicate that text in certain elements of a markup language document should be displayed in a green color. As another example, the "font-size" property may be set to "9pt" to indicate that the size of text in certain elements should be 9 points. As yet another example, the "font-family" property may be set to "arial, sans-serif" to indicate that text in certain elements should be displayed in Arial font if that font is available on the browser, or in Sans-Serif font if Arial is not available.

An example of a simple Cascading Style Sheet is shown below:

```
table {
    color: blue;
    font-size: 9pt;
}
```

The style sheet above may be applied to a markup language document such as the HTML table specified previously. A browser using this style sheet to render that table would display the integers in the table using a blue, 9-point font.

The selectors in a Cascading Style Sheet may also take the format ".X". A selector specified in this manner is known as an attribute class selector, and the formatting descriptions associated with the selector may be applied to the elements in a markup language document that have a "class" attribute set to the value "X". That is, the formatting descriptions may be applied to any tag with the following format: "<tag_name class="X" . . . > content . . . </tag_name>". Attribute class selectors may be thought of as identifying classes of elements to which to apply formatting properties. Other types of selectors may be available (see, e.g., W3C's CSS specifications for additional types of selectors). Different types of selectors may specify different portions of markup language documents to which to apply the corresponding formatting descriptions.

In order for a program, e.g., a browser 120, to apply the formatting descriptions in a style sheet to a markup language document, the markup language document may need to include an instruction to associate the style sheet with the markup language document. For example, an Extensible Markup Language (XML) document may contain the following instruction: "<?xml-stylesheet type="text/css" "href="style_sheet_1.css"?>". Such an instruction indicates that the XML document is to be rendered using a style sheet named "style_sheet_1.css", which is a Cascading Style Sheet.

As shown in FIG. 1, multiple style sheets 102, 104, 106 may be used to render a markup language document 100. In such a situation, all of the formatting descriptions specified in the multiple style sheets 102, 104, 106 may be applied to the markup language document 100.

Two Cascading Style Sheets are shown below. The first style sheet in this example is named "page.css," and it includes the following formatting descriptions:

```
.page {
    background-color: blue;
    font-family: arial, sans-serif;
```

```
    font-size: 9pt;
}
.grouping {
    background-color: yellow;
    font-family: arial, sans-serif;
    font-size: 9pt;
}
```

The formatting descriptions in the "page.css" style sheet specify that elements in which the "class" attribute is set to "page" should be rendered on a blue background using a 9-point Arial font (or a Sans-Serif font if Arial is not available). In addition, elements in which the "class" attribute is set to "grouping" should be rendered on a yellow background using a 9-point Arial font (or a Sans-Serif font if Arial is not available).

The second style sheet is named "text.css", and it includes the following formatting descriptions:

```
.emphasizedText {
    font-family: arial, sans-serif;
    font-size: 12 pt;
}
```

The formatting descriptions above specify that elements in which the "class" attribute is set to "emphasizedText" should be rendered using a 12-point Arial font (or a Sans-Serif font if Arial is not available). The "page.css" and "text.css" style sheets specified above shall be referred to as the "main example" throughout the rest of this specification.

Parametrized representations of style sheets may be used to facilitate the generation and modification of style sheets. A parametrized representation of a style sheet contains one or more parameters or variables that may be set to or associated with specific values. A parameter may be used, referenced in, or otherwise associated with multiple formatting descriptions, and it may be possible to modify all of the associated formatting descriptions by simply changing the value of the parameter.

Figure 2:
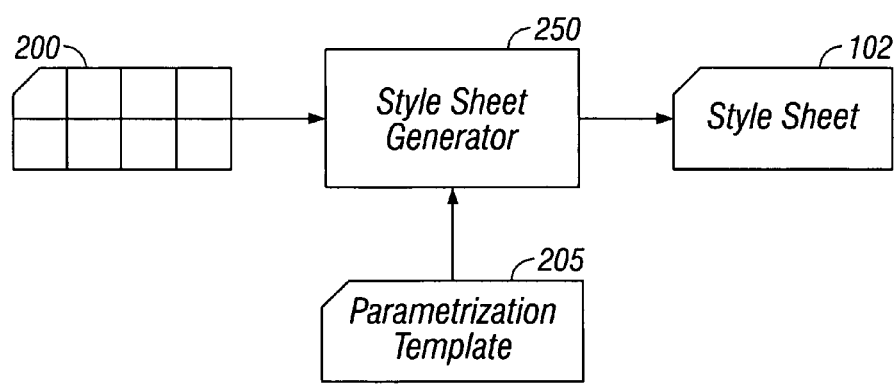
FIG. 2 is a block diagram of a system that generates a style sheet from a parametrized representation of the style sheet.

As shown in FIG. 2, a style sheet 102 may be generated from a parametrized representation 200 of the style sheet by a style sheet generator 250. The style sheet generator 250 may take as input a parametrized representation 200 of a style sheet, which may include a set of parameters and associated values, as well as a parametrization template 205, which may specify how to use the parametrized representation 200 to generate the style sheet 102. The parametrization template 205 may describe how to assemble the style sheet 102 from the parameters in the parametrization template 200.

As a simple example, a parametrized representation 200 of the "page.css" style sheet may contain one parameter, "RegularFontSize", which may be set to or associated with the value "9pt". A parametrization template 205 may then specify the following model for generating the style sheet 102:

```
.page {
    background-color:blue;
    font-family: arial, sans-serif;
    font-size: $RegularFontSize;
}
```

```
.grouping {
    background-color: yellow;
    font-family: arial, sans-serif;
    font-size: $RegularFontSize;
}
```

The template above looks very similar to the style sheet "page.css", except that the template specifies where the value of the parameter "RegularFontSize" should be used. The style sheet generator 250 may generate the "page.css" style sheet 102 by replacing the parameter "RegularFontSize" with the value assigned to the parameter in the parametrized representation 200.

The above architecture makes it possible to modify a style sheet 102 by changing the value of a parameter in the parametrized representation 200 (or by plugging in a different parametrized representation), and using the parametrization template 205 to regenerate the style sheet 102. Design changes may thus be applied in a more consistent manner because style sheets are generated automatically. For example, if a designer were to edit the "page.css" style sheet manually, he might update the "font-size" property in the ".page" class, but inadvertently forget to update that same property in the ".grouping" class. In contrast, if the designer uses the above architecture, he can simply change the value associated with the "RegularFontSize" parameter in the parametrized representation 200, and that change can be propagated to all of the appropriate classes upon the regeneration of the style sheet 102.

A more complex parametrization model may contain multiple types of parameters. In one implementation, a parametrized representation may include "value" parameters and "rule" parameters, as explained below.

A value parameter corresponds to a formatting property type, e.g., a color or a length. A value parameter may be set to or associated with any permissible value of the corresponding formatting property type. For example, if a value parameter named "Length1" corresponds to the "length" formatting property type, then "Length1" may be associated with any permissible value of that property type (e.g., "9 in", "9px", or "9pt", which are values that specify lengths of 9 inches, 9 pixels, or 9 points, respectively). As another example, if a value parameter named "PaletteColor1" corresponds to the "color" formatting property type, then "PaletteColor1" may be associated with any permissible value of that property type (e.g., "blue", "yellow", "green", etc.).

A rule parameter corresponds to a formatting property— e.g., the CSS property "font-size". A rule parameter may be set to or associated with any permissible value of the corresponding formatting property. For example, if a rule parameter named "PageFontSize" corresponds to the "font-size" property, then "PageFontSize" may be associated with any permissible value of the "font-size" property (e.g., "9pt", "10pt", etc.). As another example, if a rule parameter named "PageFontColor" corresponds to the "color" property, then "PageFontColor" may be associated with any permissible value of the "color" property (e.g., "blue", "yellow", "green", etc.).

The relationship between a formatting property and a formatting property type is that each formatting property may be assigned a value of a certain formatting property type. For example, "width" and "height" are two CSS formatting properties; these two properties may be assigned values of the "length" type (e.g., values such as "9 in", "9px", "9pt", etc.). As another example, "color" and "background-color" are two formatting properties; these two properties may be assigned values of the "color" type (e.g., values such as "blue", "yellow", "green", etc.). The latter example may be somewhat confusing because "color" is both a CSS property (the color in which text is to be displayed) and a property type (a type of value that may be assigned to color-related properties).

A rule parameter may be bound to a value parameter. Such a binding indicates that the formatting property corresponding to the rule parameter should be set to or associated with the value of the bound value parameter (i.e., the value that is associated with the bound value parameter). For example, if the rule parameter "PageBackgroundColor" corresponds to the formatting property "background-color", and the value parameter "PaletteColor1" is associated with the color value "blue", then a binding of "PageBackgroundColor" to "PaletteColor1" indicates that the generated style sheet should associate the "background-color" property with the value "blue".

Rule parameters may thus be associated with a value either directly or indirectly. A direct association indicates that the property that corresponds to the rule parameter should be associated with a specific value. An indirect association is a binding that indicates that the property that corresponds to the rule parameter should be associated with the value of another parameter (i.e., with the value of the bound parameter).

Continuing with the above example, "PageBackgroundColor" may either be associated with a value directly (by associating "PageBackgroundColor" with, e.g., the value "yellow"), or indirectly (by binding "PageBackgroundColor" to a value parameter, e.g., "PaletteColor1"). In the former case, the property that corresponds to the "PageBackgroundColor" parameter (i.e., the "background-color" property) will be set to the value that is associated with "PageBackgroundColor" (i.e., "yellow"). In the latter case, the "background-color" property will be set to the value that is associated with "PaletteColor1" (e.g., "blue" in the example above).

The use of bindings may result in more compact style sheet parametrizations. For example, multiple rule parameters (properties) may be bound to one value parameter. The value given to the value parameter (e.g., a color value such as "blue") may thus be specified once, rather than once for each rule parameter that is to be set to that value. Moreover, the use of value parameters may enable styles to be modified more efficiently and consistently. For example, a designer may be able to effect changes to multiple properties by updating the value of a single value parameter. When the corresponding style sheet is regenerated, the updated value may be propagated automatically and consistently to all of the properties associated with the bound rule parameters.

As a further example, the parametrization model specified above will now be applied to the "page.css" and "text.css" style sheets specified in the main example. The "page.css" and "text.css" style sheets may be represented by the parameters shown below in Table 2.

TABLE 2

| Parameter | Type | Corresponding Property or Property Type |
| --- | --- | --- |
| PageBackgroundColor | rule | CSS property: "background-color" |
| PaletteColor1 | value | CSS property type: color |
| PaletteColor2 | value | CSS property type: color |

TABLE 2-continued

| Parameter | Type | Corresponding Property or Property Type |
| --- | --- | --- |
| PageFontFamily | rule | CSS property: "font-family" |
| PageFontSize | rule | CSS property: "font-size" |
| GroupBackground | rule | CSS property: "background-color" |
| EmphasizedFontSize | rule | CSS property: "font-size" |

The sample parametrization template 205 shown in Table 3 below specifies how to assemble the parameters above into the style sheets "page.css" and "text.css".

TABLE 3

| Style Sheet | Selector | Binding |
| --- | --- | --- |
| page.css | .page | PageBackgroundColor(PaletteColor1) PageFontFamily PageFontSize |
| page.css | .grouping | GroupBackground(PaletteColor2) PageFontFamily PageFontSize |
| text.css | .emphasizedText | PageFontFamily EmphasizedFontSize |

The parametrization template above may be interpreted as follows. The style sheet "page.css" contains two selectors: ".page" and ".grouping". The ".page" selector contains three formatting descriptions. The first formatting description contains a binding that specifies that the property that corresponds to the "PageBackgroundColor" parameter (i.e., the "background-color" property) should be set to the value that is associated with the "PaletteColor1" parameter. The second formatting description specifies that the property that corresponds to the "PageFontFamily" parameter (i.e., the "font-family" property) should be set to the value that is associated with the "PageFontFamily" parameter. And the third formatting description specifies that the property that corresponds to the "PageFontSize" parameter (i.e., the "font-size" property) should be set to the value that is associated with the "PageFontSize" parameter.

The ".grouping" selector also contains three formatting descriptions. The first formatting description contains a binding that specifies that the property that corresponds to the "GroupBackground" parameter should be set to the value that is associated with the "PaletteColor2" parameter. The second and the third formatting descriptions are the same as for the ".page" selector.

The style sheet "text.css" contains one selector, ".emphasizedText", which is to have two formatting descriptions. The first formatting description specifies that the property that corresponds to the "PageFontFamily" parameter (i.e., the "font-family" property) should be set to the value that is associated with the "PageFontFamily" parameter. The second formatting description specifies that the property that corresponds to the "EmphasizedFontSize" parameter (i.e., the "font-size" property) should be set to the value that is associated with the "EmphasizedFontSize" parameter.

The values that are associated with each of the parameters in Table 2 are specified in Table 4 below.

TABLE 4

| Parameter | Value |
| --- | --- |
| PageBackgroundColor | value of PaletteColor1 |
| PaletteColor1 | blue |

TABLE 4-continued

| Parameter | Value |
|---|---|
| PaletteColor2 | yellow |
| PageFontFamily | arial, sans-serif |
| PageFontSize | 9pt |
| GroupBackground | value of PaletteColor2 |
| EmphasizedFontSize | 12 pt |

As shown in Table 4, rule parameters may be associated with either a value or a value parameter. The latter association indicates a binding that specifies that a rule parameter should actually be associated with the value of the bound value parameter. Given the properties, values, and bindings specified in Tables 2, 3, and 4, a style sheet generator can produce the same "page.css" and "text.css" style sheets that were listed at the beginning of the main example.

A parametrized representation 200 may be stored in various formats, and may include information of the type shown in Tables 2, 3, and 4 above. For example, a parametrized representation 200 may be stored as an indexed table that contains a row for each design parameter, as shown in Table 5 below.

TABLE 5

| Parameter | Property/ Property Type | page.css | text.css | Value |
|---|---|---|---|---|
| PageBackgroundColor | "background-color" | .page | — | value of PaletteColor1 |
| PaletteColor1 | color | .page | — | blue |
| PaletteColor2 | color | .grouping | — | yellow |
| PageFontFamily | "font-family" | .page .grouping | .emphasizedText | arial, sans-serif |
| PageFontSize | "font-size" | .page .grouping | — | 9pt |
| GroupBackground | "background-color" | .grouping | — | value of PaletteColor2 |
| EmphasizedFontSize | "font-size" | — | .emphasizedText | 12 pt |

Each row in the example above contains a specification of a parameter, the property or property type to which the parameter corresponds, the selectors or classes in each style sheet that use, rely on, or are otherwise associated with the parameter (and that may thus need to be modified if the value of the parameter changes), and a value associated with the parameter. In the example above, the last column is the only column that contains design values, and is thus the only column that may need to be modified by a designer in order to change a design style or theme.

Figure 3:
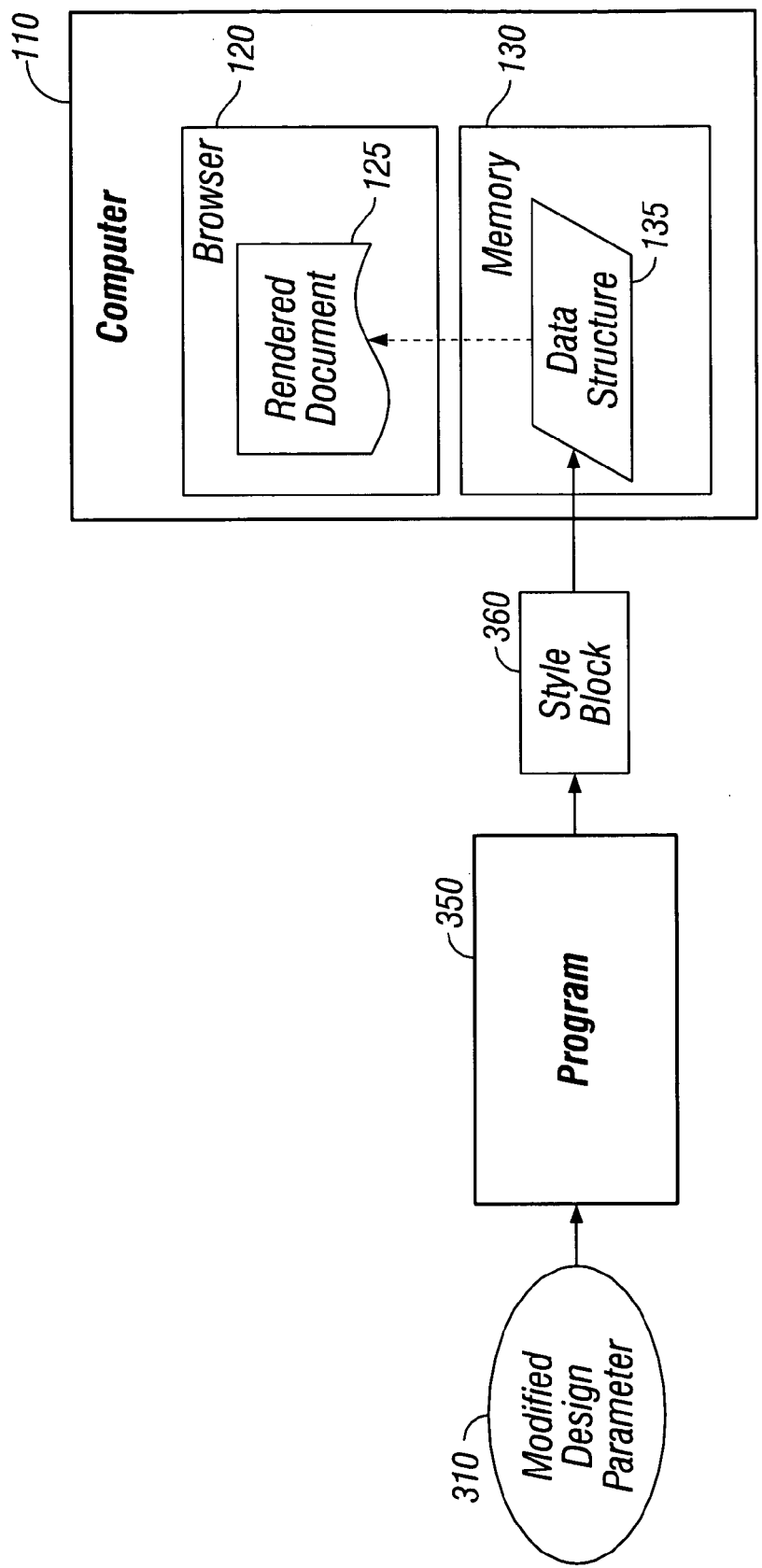
FIG. 3 is a block diagram of a system that displays the effect of a design parameter change.

When a design parameter is changed, the effect of the change may be shown by regenerating the style sheets that use the design parameter, and re-rendering the markup language document using the regenerated style sheets. FIG. 3 shows an alternative system for displaying the effect of a design parameter change. Rather than regenerating one or more entire style sheets, a program 350 may take the modified value of a design parameter 310, generate a style block 360 that specifies one or more formatting descriptions based on the modified value of the design parameter 310, and apply the style block 360 directly to a rendered markup language document 125.

A style block includes a set of formatting descriptions that resembles a style sheet and that may be thought of as a portion of a style sheet. A style block may include only some of the selectors specified in an actual style sheet. Moreover, each selector may include only some of the formatting descriptions specified for the selector in the style sheet. A style block may also include all of the selectors and all of the formatting descriptions specified in a style sheet. The values specified in the formatting descriptions in a style block may be different than the values specified in the formatting descriptions in a style sheet.

Continuing with the main example, a designer may change the value associated with "PageFontSize" from "9pt" to "14pt". The entry for the "PageFontSize" parameter in Table 5 shows that the affected selectors are ".page" and ".grouping", meaning that the corresponding "font-size" property should be modified to reflect the new value for all the elements in the markup language document that have a "page" or "grouping" class attribute. The following style block 360 may be generated to effect this modification:

```
<style>
  .page, .grouping {
    font-size: 14 pt;
  }
</style>
```

The listing of two selectors separated by a comma is a shorthand way of indicating that the corresponding formatting descriptions should be applied to both selector classes. The formatting description in this case includes only one instruction, which sets the property "font-size" to the value "14pt".

The application of the above style block to a rendered markup language document may result in the content in all of the elements in the document that have a "class" attribute set to either "page" or "grouping" being displayed in a 14-point font. All of the other formatting properties of those elements are left unchanged. Thus, assuming that a markup language document was rendered using the "page.css" style sheet specified in the main example, application of the above style block to the markup language document may result in the rendering of "page" and "grouping" class elements using 14-point Arial (or Sans-Serif) font on a blue background.

In other words, the formatting descriptions in a style block may be combined with the formatting descriptions in a style sheet, and the affected elements may be rendered using both sets of formatting descriptions. If a formatting property is included in both a style sheet and a subsequently-applied style block, the description of that property in the style block may override the description in the style sheet. In general, the description of that property in the most recently applied style block may override all earlier descriptions.

As shown in FIG. 3, when a browser 120 renders a markup language document, the browser 120 may generate a data structure 135 that represents the markup language document. The browser 120 may store the data structure 135 in a memory 130 of computer 110. If the elements in a markup language are arranged hierarchically, the data structure may be a tree that reflects the hierarchical arrangement of the elements. For example, HTML or XML documents may be represented by a data structure known as a Document Object Model (DOM) tree. DOM is a W3C standard that specifies a data structure that can be used to store a representation of an HTML or XML document, as well as a set of interfaces for accessing the elements of that data structure.

A program may modify the data structure 135 directly. For example, a DOM tree may be modified by a program such as a JavaScript program running on computer 110. If the program is part of an HTML-based application, the application may be referred to as a Dynamic HTML (DHTML) application to indicate that it uses or manipulates the DOM tree. The program may contain instructions that either add, delete, or modify elements of the data structure 135, thereby modifying the rendered document 125 itself. Thus, rather than modifying a markup language document and causing a browser to re-render the revised markup language document (e.g., by invoking a "refresh" operation in the browser), a rendered document 125 may be altered directly by modifying the data structure 135 that represents the rendered document 125.

In the case of style or formatting changes, a style block 360 may be added to the data structure 135, e.g., by adding a node that contains the style block 360 to the DOM tree. The browser 120 may then apply the formatting descriptions in the style block 360 to the elements that match the selectors specified in the style block, thereby changing the appearance of those elements in the rendered document 125 to match the formatting descriptions in the style block.

Revising a rendered document 125 through the application of a style block 360 may provide several advantages. First of all, the appearance of the affected elements may be changed without re-rendering the entire markup language document. As a result, the effect of a design parameter change may be viewed without the flicker that typically occurs when a browser re-renders a page. Moreover, using a style block to revise a rendered document is likely to be quicker than generating an updated style sheet and re-rendering the markup document using the updated style sheet. That is especially likely to be the case if the style sheet, and possibly the markup language document itself, are stored on a server that is remote from the computer 110. In such a scenario, the regenerated style sheet approach may require transmission of the modified design parameter from the computer 110 to the server, generation of an updated style sheet at the server based on the modified design parameter, transmission of the updated style sheet and the markup language document from the server to the computer 110, and re-rendering of the markup language document using the updated style sheet at the computer 110.

In contrast, the style block approach specified herein may be carried out locally. For example, a JavaScript program may receive an updated design parameter, generate a style block, and apply the style block to the DOM tree representation of the markup language document, thereby displaying the effect of the design parameter change without the need to communicate with a server.

Moreover, the style block approach specified herein may be used to preview the effect of a design parameter change without having to apply the change across multiple style sheets or markup documents. In the client-server example above, a change in a design parameter may cause the server to regenerate multiple style sheets so as to reflect the change across multiple markup documents, and perhaps across an entire web site or portal. In contrast, the style block approach may allow the impact of a design parameter change to be previewed without necessarily having to propagate such a change beyond a rendered markup language document 125.

Figure 4:
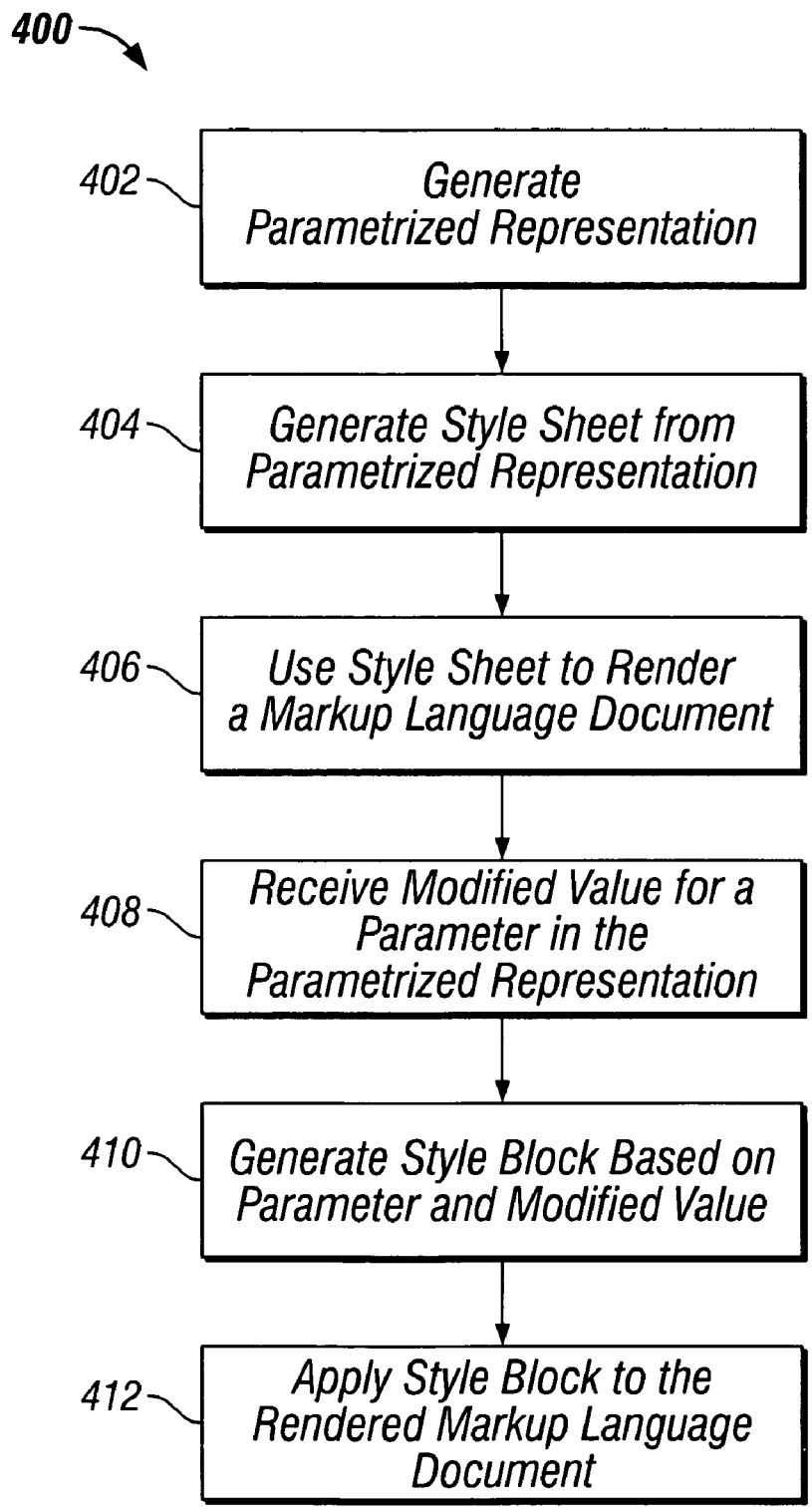
FIG. 4 shows a flowchart of a process for displaying the effects of a design parameter change.

FIG. 4 depicts a process 400 for displaying the effects of a design parameter change. A parametrized representation of a style sheet is first generated (402). The parametrized representation may specify one or more parameters, each of which may correspond to a formatting property. The parametrized representation may also specify a value to be associated with each parameter. As explained above, a parameter may be bound to another parameter to indicate that the property corresponding to the first parameter should be set to the value of the second parameter.

A style sheet is then generated from the parametrized representation (404). A parametrization template may specify how the parameters in the parametrized representation are to be used to generate the style sheet.

The generated style sheet may then be used to render a markup language document (406). This may be accomplished through an instruction that binds the markup language document to the generated style sheet. Such a binding may instruct a browser to use the formatting descriptions in the generated style sheet to render the markup language document.

Next, a modified value is received for one or more of the parameters in the parametrized representation (408). This may be accomplished through simple text input fields. Alternatively, a more complicated graphical user interface (GUI) could be used. The GUI may contain, for example, radio buttons or drop-down boxes to let a user choose values from predefined sets of values. The sets of available values may be modified to match the skill of the user—for example, an advanced user may be presented with more options for each parameter, as well as possibly with the opportunity to modify more advanced parameters. Additional GUI elements—e.g., a color picker that allows a user to select a color from a spectrum of colors—may also be used.

A style block is then generated (410). The style block may include one or more formatting descriptions based on the modified parameter values. The formatting descriptions may associate the property corresponding to each modified parameter with the revised value provided for that parameter. The generation of the style block may be triggered automatically—e.g., as soon as the user provides a modified parameter value. Alternatively, the generation of the style block may be triggered manually—e.g., a user may modify a number of parameters, and trigger the generation of a style block that reflects all of the revised parameters by clicking a button such as "show changes" button.

Next, the generated style block is applied to the rendered markup language document (412). As explained above, this may be accomplished by using the style block to modify a data structure associated with the rendered markup language document. For example, a style block may be inserted into a DOM tree that represents an HTML document.

The generation of a style block and the application of the style block to a rendered markup language document may occur substantially immediately after the reception of a modified parameter value. For example, all three operations may occur on the computer that is being used to display the markup language document, without communication with external computers or other systems. The operations may also be performed without the need to propagate the revised parameter values to other files or systems (e.g., to other style sheets, markup documents, or computers).

The revised parameter values may be saved in the parametrized representation, and a revised style sheet may be generated based on the revised parametrized representation. For example, if a user previews a design parameter change and likes the changed formatting properties, he may optionally invoke a function to store the modified parameter values in the parametrized representation. A revised style sheet may then be generated using the revised parametrized representation. The generation of a revised style sheet may be triggered either by the user or by the system (e.g., upon the saving of the parametrized representation).

Continuing with the main example, the program 350 in FIG. 3 may receive modified parameter values through the use of the following text input fields:

```
<input type="text" disabled parIndex=0
cssProperty="background-color" value="PaletteColor1">
    <input type="text" parIndex=1 cssType="color"
value="blue">
    <input type="text" parIndex=2 cssType="color"
value="yellow">
    <input type="text" parIndex=3 cssProperty="font-family"
value="arial, sans-serif">
    <input type="text" parIndex=4 cssProperty="font-size"
value="9pt">
    <input type="text" disabled parIndex=5
cssProperty="background-color" value="PaletteColor2">
    <input type="text" parIndex=6 cssProperty="font-size"
value="12 pt">
```

The input fields above correspond to the parameters, types, properties, and values specified in Table 5. Each field provides the user with an input area in which to provide text input. The text input may represent a modified parameter value, which may be used to generate a style block as explained below. The attributes of the input fields above may be interpreted as follows.

The "type" attribute indicates that the input fields are text fields.

The first and the sixth input fields have a "disabled" attribute, which indicates that users may not provide input in those fields. As shown in Table 5, this is because the first and the sixth parameters ("PageBackgroundColor" and "GroupBackground", respectively) are bound to value parameters. In other words, the values of the first and sixth parameters may not be modified directly—instead, they may be modified by adjusting the value of the bound value parameters. The "value" attribute of the first and the sixth parameters specifies the value parameters to which the respective rule parameters are bound.

The "parindex" attribute represents the number of each parameter, and is used in conjunction with a JavaScript program to generate style blocks, as explained below.

The "cssProperty" attribute indicates the formatting property that corresponds to each rule parameter. Similarly, the "cssType" attribute indicates the formatting property type that corresponds to each value parameter.

Finally, the "value" parameter indicates the initial value to be associated with each parameter. For rule parameters that are bound to a value parameter, the "value" attribute indicates the value parameter to which the rule parameter is bound.

The program 350 may use the above input fields in conjunction with the array in the JavaScript code shown below in order to receive modified parameter values and to generate style blocks to modify the formatting properties of the appropriate elements in a markup language document.

```
<script>
    var ar = new Array( );
    ar[0] = ".page"
    ar[1] = "0"
    ar[2] = "5"
    ar[3] = ".page, .grouping, .emphasizedText"
    ar[4] = ".page, .grouping"
    ar[5] = ".grouping"
    ar[6] = ".emphasizedText"
</script>
```

The script above creates an array named "ar" that has one entry for each design parameter. The entries in the array correspond roughly to the third and fourth columns in Table 5, which indicate the selectors (and thus the classes of elements) that need to be updated when a parameter is modified. That is, the entries in the array (and in Table 5) indicate what selectors need to be included a style block when a parameter is modified.

To explain how a program 350 may use the above array, consider an example in which a user modifies the fifth input field, which corresponds to the "PageFontSize" parameter. When the value in the input field is changed, a function (e.g., a JavaScript function) may be triggered in program 350. The function may use the attributes in the changed input field (in this case, the fifth input field) to determine certain information. For example, the function may determine that the formatting property that needs to be updated is "font-size" (this is the "cssProperty" attribute of the fifth input field).

The function may then use the value of the "parIndex" attribute as an index into the "ar" array. In this example, the attribute "parIndex" is set to "4", so the function retrieves the value of ar[4], which tells the function that ".page" and ".grouping" are the classes that need to be modified.

Given the above information, the function may generate a style block that specifies that the classes ".page" and ".grouping" should have the "font-size" property set to the new value specified by the user. In other words, the function may generate the style block below:

```
<style>
    .page, .grouping {
        font-size: new_value
    }
</style>
```

(Of course, the style block would specify the actual value provided by the user in place of "new_value".) Finally, the function may apply the generated style block to the rendered markup language document. The function may do this, for example, by inserting the style block into the DOM tree that represents the rendered markup language document.

As another example, consider the case in which the user modifies the second input field, which corresponds to the "PaletteColor1" parameter. When the value in the second input field is changed, a function (e.g., a JavaScript function) may be triggered in program 350. As with the previous example, the function may use the attributes in the changed input field (in this case, the second input field) to determine how to proceed.

In this example, the function may determine that the parameter is value parameter because of the "cssType" attribute. Consequently, the function may find all the rule parameters that are bound to the modified value parameter, and generate one or more style blocks that set the properties that correspond to those rule parameters to the new value provided by the user.

The first task may be accomplished by looking into the "ar" array using the value of the "parIndex" attribute. In this case, the "parIndex" attribute is set to "1", so the function retrieves the value of ar[1]. The retrieved value is "0", which tells the function that the parameter whose "parIndex" attribute is set to "0" (i.e., the first parameter, "PageBackgroundColor") is bound to the parameter that the user modified. The function may then retrieve the value of ar[0] to determine what classes are affected (i.e., what classes should be specified in the generated style block), and check the attributes of the input field whose "parIndex" attribute is set to "0" to determine what formatting property should be adjusted (i.e., what formatting property should be included in the formatting description in the generated style block). In other words, once the function knows which parameter is bound to the value parameter that the user changed, it can use the same algorithm as in the previous example to set the appropriate property in the appropriate classes to the new value entered by the user.

In the current example, ar[1] is set to "0", which indicates that the value parameter modified by the user is only bound to one rule parameter (the rule parameter whose "parIndex" attribute is set to "0"). If the modified value parameter were bound to more than one rule parameter, the entry for ar[1] would include a list of the "parIndex" values of all the rule parameters that were bound to the modified value parameter. In such a case, the function in program 350 may use the same algorithm as in the previous example to generate a style block for each rule parameter that is bound to the modified value parameter. The function may then assemble one large style block that includes the style blocks generated for each of the bound rule parameters, and apply the large style block to the rendered markup language document (e.g., by inserting the large style block into the DOM tree that represents the rendered markup language document).

Figure 5:
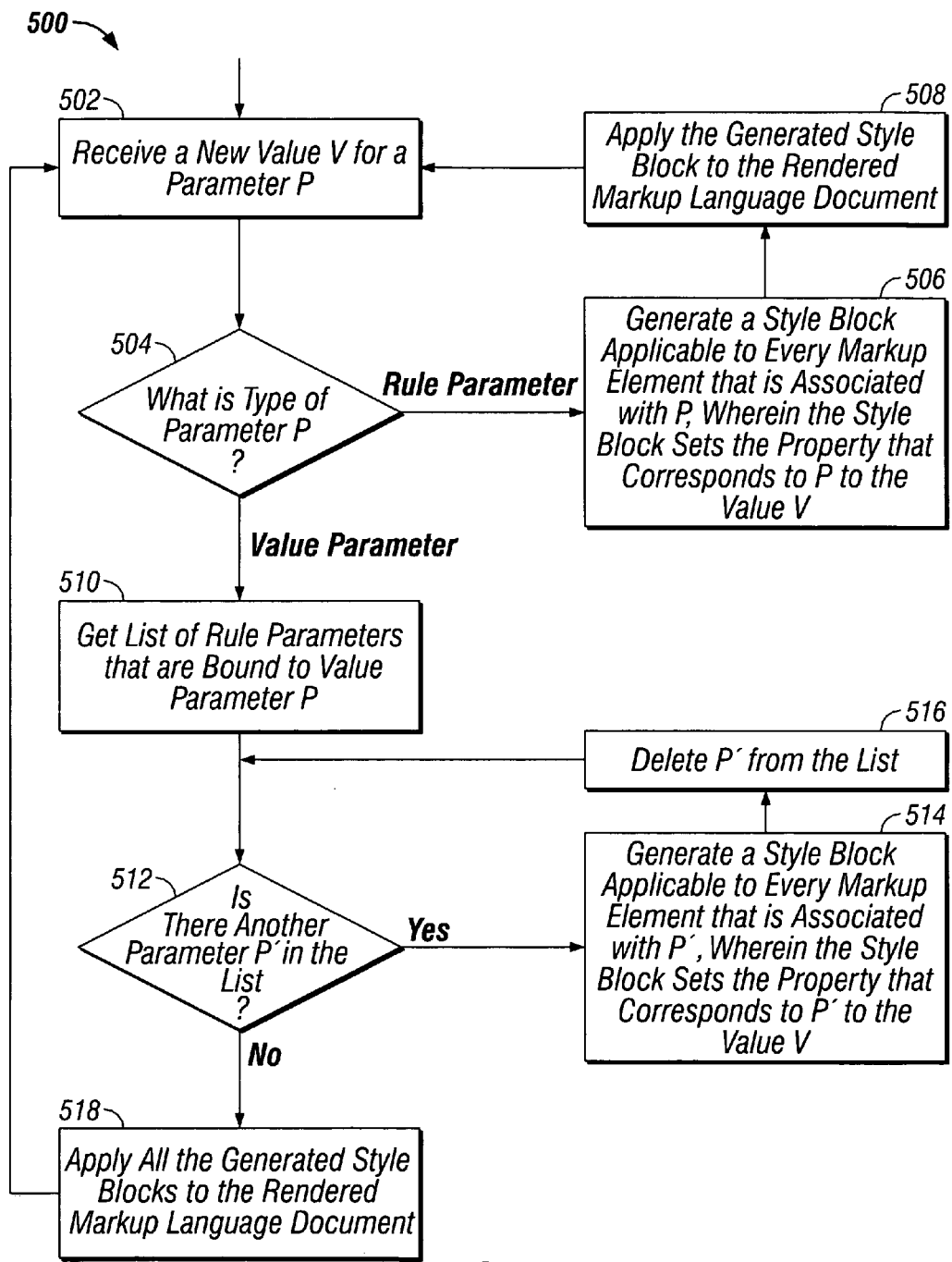
FIG. 5 shows a flowchart of a process for generating style blocks that correspond to design parameter changes.

FIG. 5 shows a process 500 that may be implemented by a program 350 in order to generate style blocks. A new value V is first received for a parameter P (502). If parameter P is a rule parameter (504), a style block that sets the property that corresponds to P to the value V is generated (506). The style block may indicate that that formatting description should apply to all the markup elements that are associated with P. Such an association may be expressed, for example, in a style sheet, in the parametrized representation of a style sheet, or in a parametrization template. In one implementation, the style block may include selectors for all the classes that are associated with P, as indicated in a table or array. The generated style block may then be applied to the rendered markup language document (508). The process then waits to receive a new value for a parameter (502).

If parameter P is a value parameter (504), a list of all the rule parameters that are bound to P may be determined (510). If there is another rule parameter P' in the list (512), a style block that sets the property that corresponds to P' to the value V is generated (514). The style block may indicate that that formatting description should apply to all the markup elements that are associated with P'. (As above, such an association may be expressed in a style sheet, in the parametrized representation of a style sheet, or in a parametrization template. In one implementation, the style block may include selectors for all the classes that are associated with P', as indicated in a table or array.) P' is then deleted from the list (516). The process loops for each rule parameter P' in the list until the list is empty (512). The generated style blocks may then be assembled and applied to the rendered markup language document (518). The process then waits to receive a new value for another parameter (502).

Various implementations of the systems and techniques described here can be realized in digital electronic circuitry, integrated circuitry, specially designed ASICs (application-specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device. Such computer programs (also known as programs, software, software applications or code) may include machine instructions for a programmable processor, and may be implemented in any form of programming language, including high-level procedural and/or object-oriented programming languages, and/or in assembly/machine languages. A computer program may be deployed in any form, including as a stand-alone program, or as a module, component, subroutine, or other unit suitable for use in a computing environment. A computer program may be deployed to be executed or interpreted on one computer or on multiple computers at one site, or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; CD-ROM and DVD-ROM disks; and programmable logic devices (PLDs). The processor and the memory can be supplemented by, or incorporated in special purpose logic circuitry.

As used herein, the term "machine-readable medium" refers to any computer program product, apparatus, and/or device used to provide machine instructions and/or data to a programmable processor, including any type of mass storage device.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., a database or a data server), a middleware component (e.g., an application server), or a front-end component (e.g., a client computer having a user interface, such as a graphical user interface or a Web browser, through which a user can interact with an implementation of the systems and techniques described herein), or any combination of such back-end, middleware, or front-end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

The processes and logic flows described herein may be performed by one or more programmable processors executing a computer program to perform the functions described herein by operating on input data and generating output. The processes and logic flows may also be performed by, and the systems and techniques described herein may be implemented as, special purpose logic circuitry, e.g., a field programmable gate array (FPGA) or an ASIC.

The foregoing has been described in terms of particular embodiments. Other embodiments may be implemented. For example, the logic flows depicted in FIGS. 4 and 5 do not require the particular order shown, or sequential order, to achieve desirable results (e.g., receiving a modified value for a parameter in a parametrized representation may be performed at many different places within the overall process). In certain implementations, multitasking and parallel processing may be preferable. Other embodiments may be within the scope of the following claims.

What is claimed is:

1. A computer-implemented method comprising:
   receiving, at a script program at a client computer, a replacement style sheet parameter value to be used to replace an existing style sheet parameter value associated with a previously rendered markup language document, wherein the script program comprises a parameterization template including a value parameter and a rule parameter, the value and rule parameters modified during replacement;
   generating, at the script program at the client computer, a style block associated with a portion the existing style sheet; and
   inserting, by the script program at the client computer, the replacement style sheet parameter value into the style block by applying the style block to a data structure of the previously rendered markup language document, enabling application of the style block including the replacement style sheet parameter value to the previously rendered markup language document, when a property included in the style block overrides a property included in the existing style sheet, the parameter value applied without communicating with a server associated with the previously rendered markup language document.

2. The method of claim 1 wherein the data structure is a Document Object Model data structure, and the script program is Java Script at the client computer.

3. The method of claim 1 wherein the inserted replacement style sheet parameter value overrides the existing style sheet parameter value.

4. The method of claim 1 wherein inserting the replacement style sheet parameter value changes the appearance of a portion of the previously rendered markup language document without re-rendering the entire markup language document.

5. The method of claim 1 further comprising storing the replacement style sheet parameter value in a parametrized representation of a style sheet.

6. The method of claim 1 further comprising generating a style sheet comprising the replacement style sheet parameter value.

7. A machine-readable medium comprising instructions that, when executed, cause a machine to perform operations comprising:
   receiving, at a script program at a client computer, a replacement style sheet parameter value to be used to replace an existing style sheet parameter value associated with a previously rendered markup language document, wherein the script program comprises a parameterization template including a value parameter and a rule parameter, the value and rule parameters modified during replacement;
   generating, at the script program at the client computer, a style block associated with a portion the existing style sheet; and
   inserting, by the script program at the client computer, the replacement style sheet parameter value into the style block by applying the style block to a data structure of the previously rendered markup language document, enabling application of the style block including the replacement style sheet parameter value to the previously rendered markup language document, when a property included in the style block overrides a property included in the existing style sheet, the parameter value applied without communicating with a server associated with the previously rendered markup language document.

8. The machine-readable medium of claim 7 wherein the data structure is a Document Object Model data structure.

9. The machine-readable medium of claim 7 wherein the inserted replacement style sheet parameter value overrides the existing style sheet parameter value.

10. The machine-readable medium of claim 7 wherein the operation to insert the replacement style sheet parameter value changes the appearance of a portion of the previously rendered markup language document without re-rendering the entire markup language document.

11. The machine-readable medium of claim 7 wherein the operations further comprise:
    store the replacement style sheet parameter value in a parametrized representation of a style sheet.

12. The machine-readable medium of claim 7 wherein the operations further comprise:
    generate a style sheet comprising the replacement style sheet parameter value.

13. A computer-implemented method of applying style changes to a markup language document, the method comprising:

generating, at a script program, a parametrized representation of a style sheet, the parametrized representation comprising a first parameter and a first value associated with the first parameter;

generating a style sheet from the parametrized representation;

using the generated style sheet to render a markup language document;

receiving, at a script program at a client computer, a second value to be associated with the first parameter;

generating, at the script program at the client computer, a style block based on the second value, the style block associated with a portion of the style sheet, wherein the script program comprises the parameterized representation including a value parameter and a rule parameter, at least one of the value and rule parameters modified during a replacement of the first value; and applying, by the script program at the client computer, the style block, including the second value associated with the first parameter to a portion of the rendered markup language document, when the first value overrides the second value.

14. The method of claim 13 wherein the parametrized representation comprises a table.

15. The method of claim 14 wherein the parametrized representation comprises a second parameter, and wherein the table comprises a first row corresponding to the first parameter and a second row corresponding to the second parameter.

16. The method of claim 13 wherein the second value is received through a graphical user interface.

17. The method of claim 13 wherein the markup language document is rendered at a client computer, and wherein the operations of generating and applying the style block occur at the client computer.

18. The method of claim 13 wherein the operations of generating and applying the style block occur immediately after the operation of receiving the second value.

19. The method of claim 13 wherein applying the style block comprises inserting the style block into a Document Object Model data structure that represents the markup language document.

20. The method of claim 13 further comprising storing the second value in the parametrized representation.

21. The method of claim 20 further comprising generating a new style sheet based on the parametrized representation comprising the second value.

22. A machine-readable medium comprising instructions that, when executed, cause a machine to perform operations comprising:

generate a parametrized representation of a style sheet, the parametrized representation comprising a parameter and a first value associated with the parameter;

generate a style sheet from the parametrized representation;

use the generated style sheet to render a markup language document;

receive, at a script program at a client computer, a second value to be associated with the parameter;

generate, at the script program at the client computer, a style block based on the second value, the style block associated with a portion of the style sheet, wherein the script program comprises the parameterized representation including a value parameter and a rule parameter, at least one of the value and rule parameters modified during a replacement of the first value; and apply, by the script program at the client computer, the style block, including the second value associated with the parameter to a portion of the rendered markup language document, when the first value overrides the second value.

23. The machine-readable medium of claim 22, wherein the markup language document is rendered at a client computer, and wherein the operations to generate the style block and to apply the style block occur at the client computer.

24. The machine-readable medium of claim 22 wherein the operation to apply the style block comprises inserting the style block into a Document Object Model data structure that represents the markup language document.

25. The machine-readable medium of claim 22 wherein the operations further comprise:

store the second value in the parametrized representation.

26. The machine-readable medium of claim 25 wherein the operations further comprise:

generate a new style sheet based on the parametrized representation comprising the second value.

27. A system comprising:

a parametrized representation of a style sheet, the parametrized representation comprising a parameter and a first value associated with the parameter;

a style sheet generated from the parametrized representation; and a machine-readable medium comprising instructions that, when executed, cause a machine to perform operations comprising:

receive, at a script program at a client computer, user input comprising a second value to be associated with the parameter;

generate, at the script program at the client computer, a style block based on the second value, the style block associated with a portion of the style sheet, wherein the script program comprises the parameterized representation including a value parameter and a rule parameter, at least one of the value and rule parameters modified during replacement of the first value associated with the parameter; and apply, by the script program at the client computer, the style block, including the second value associated with the parameter to a markup language document that is rendered using the style sheet.

28. The system of claim 27 wherein the instructions comprise JavaScript instructions.

29. The system of claim 27 wherein the user input comprises a selection from a graphical user interface.

30. The system of claim 29 wherein the graphical user interface comprises graphical abstractions.

31. The system of claim 30 wherein the graphical abstractions comprise one or more of text entry fields, buttons, menus, icons, and links.

32. The system of claim 27 wherein the machine is a client computer.

33. The system of claim 27 wherein the operation to generate the style block is triggered automatically by reception of the user input.

34. The system of claim 27 wherein the operation to generate the style block is triggered manually by a user.

35. The system of claim 27 wherein the operation to apply the style block comprises inserting the style block into a Document Object Model data structure that represents the rendered markup language document.

36. The system of claim 27 wherein the operations further comprise: store the second value in the parametrized representation.

37. A system comprising:
a processor; and
a memory, wherein the processor and the memory are configured to provide a system comprising:
a parametrized representation of a style sheet, the parametrized representation comprising:
a first parameter corresponding to a first formatting property;
a second parameter corresponding to a second formatting property;
a third parameter;
a binding of the first parameter to the third parameter;
a binding of the second parameter to the third parameter; and
a formatting property value associated with the third parameter; and
a style sheet generated, at a Java script program at a client computer, from the parametrized representation, the style sheet comprising an association between the first formatting property and the formatting property value, and an association between the second formatting property and the formatting property value, the style sheet applied to a portion of a markup language document that is rendered using the style sheet, when the style sheet overrides an existing portion of the rendered markup language document, wherein the Java script program comprises the parameterized representation including a value parameter and a rule parameter, at least one of the value and rule parameters modified during replacement of the formatting property value.

38. The system of claim 37 wherein the third parameter corresponds to a formatting property type.

39. The system of claim 37 wherein the parametrized representation comprises a table, the table comprising a first row corresponding to the first parameter, a second row corresponding to the second parameter, and a third row corresponding to the third parameter.

40. A computer-implemented method comprising:
specifying a plurality of parameters, including at least a first parameter corresponding to a first formatting property, a second parameter corresponding to a second formatting property, and a third parameter;
specifying a binding between the first parameter and the third parameter;
specifying a binding between the second parameter and the third parameter;
associating a formatting property value with the third parameter; and
generating, by a script program at a client computer, a style sheet, the style sheet comprising an association between the first formatting property and the formatting property value, and an association between the second formatting property and the formatting property value, the style sheet applied to a portion of a markup language document that is rendered using the style sheet, when the style sheet overrides an existing portion of the rendered markup language document, wherein the script program comprises a parameterization template including a value parameter and a rule parameter, the value and rule parameters modified during a replacement of the formatting property value.

41. The method of claim 40 wherein the third parameter corresponds to a formatting property type.

42. The method of claim 40 wherein the first parameter, the second parameter, and the third parameter comprise a parametrized representation of a style sheet.

43. The method of claim 42 further comprising storing the parametrized representation.

44. The method of claim 40 further comprising using the generated style sheet to render a markup language document.

45. The method of claim 44 further comprising:
associating a replacement formatting property value with the third parameter;
generating a style block, the style block comprising an association between the first formatting property and the replacement formatting property value, and an association between the second formatting property and the replacement formatting property value; and
inserting the style block into a data structure associated with the rendered markup language document.

46. A machine-readable medium comprising instructions that, when executed, cause a machine to perform operations comprising:
specify a plurality of parameters, including at least a first parameter corresponding to a first formatting property, a second parameter corresponding to a second formatting property, and a third parameter;
specify a binding between the first parameter and the third parameter;
specify a binding between the second parameter and the third parameter;
associate a formatting property value with the third parameter; and
generate, by a script program at a client computer, a style sheet, the style sheet comprising an association between the first formatting property and the formatting property value, and an association between the second formatting property and the formatting property value, the style sheet applied to a portion of a markup language document that is rendered using the style sheet, when the style sheet overrides an existing portion of the rendered markup language document, wherein the script program comprises a parameterization template including a value parameter and a rule parameter, the value and rule parameters modified during a replacement of the formatting property value.

47. The machine-readable medium of claim 46 wherein the third parameter corresponds to a formatting property type.

48. The machine-readable medium of claim 46 wherein the first parameter, the second parameter, and the third parameter comprise a parametrized representation of a style sheet.

49. The machine-readable medium of claim 46 wherein the operations further comprise:
use the generated style sheet to render a markup language document.

50. The machine-readable medium of claim 49 wherein the operations further comprise:
associate a replacement formatting property value with the third parameter;
generate a style block, the style block comprising an association between the first formatting property and the replacement formatting property value, and an association between the second formatting property and the replacement formatting property value; and
insert the style block into a data structure associated with the rendered markup language document.

* * * * *